United States Patent Office 3,410,640
Patented Nov. 12, 1968

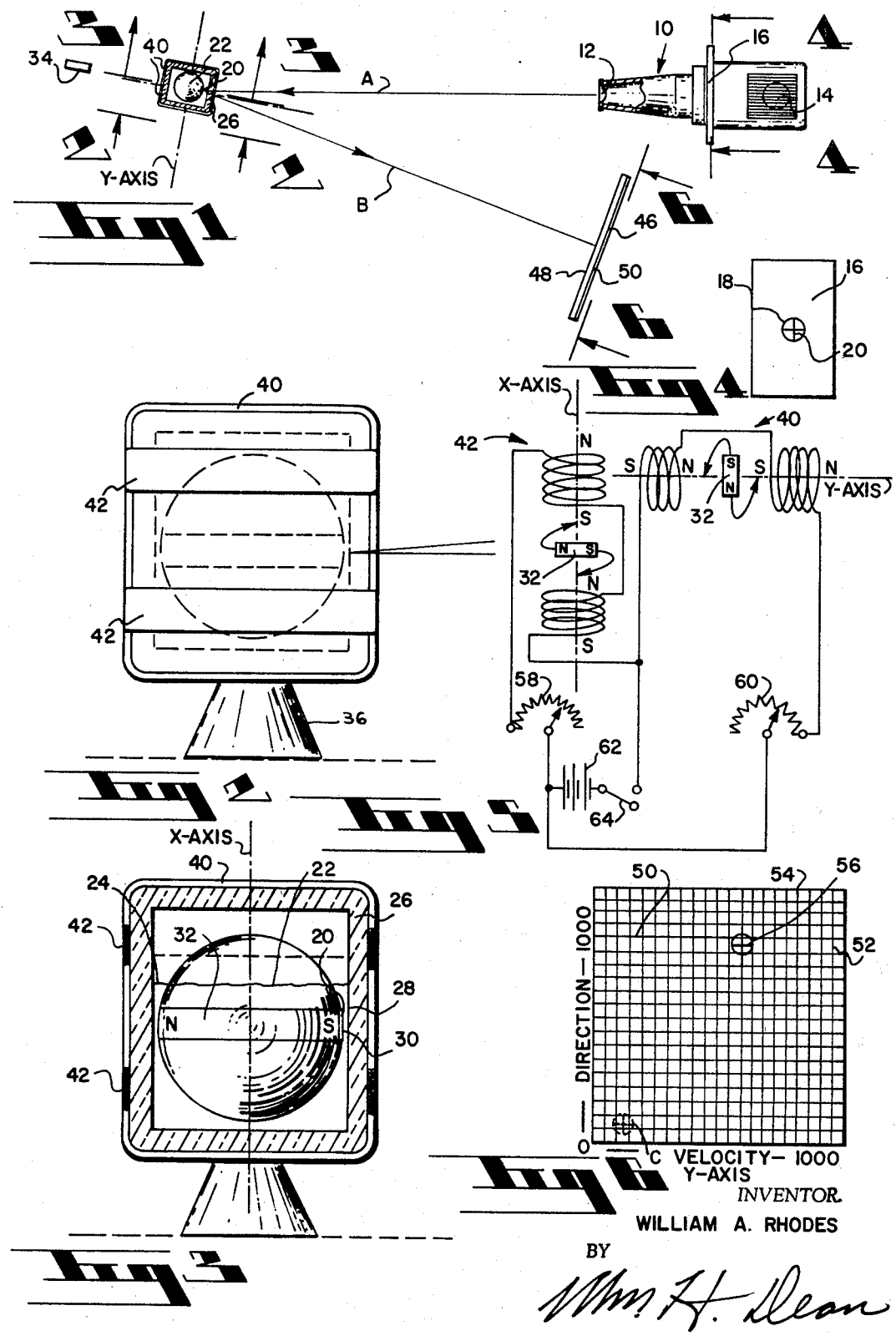

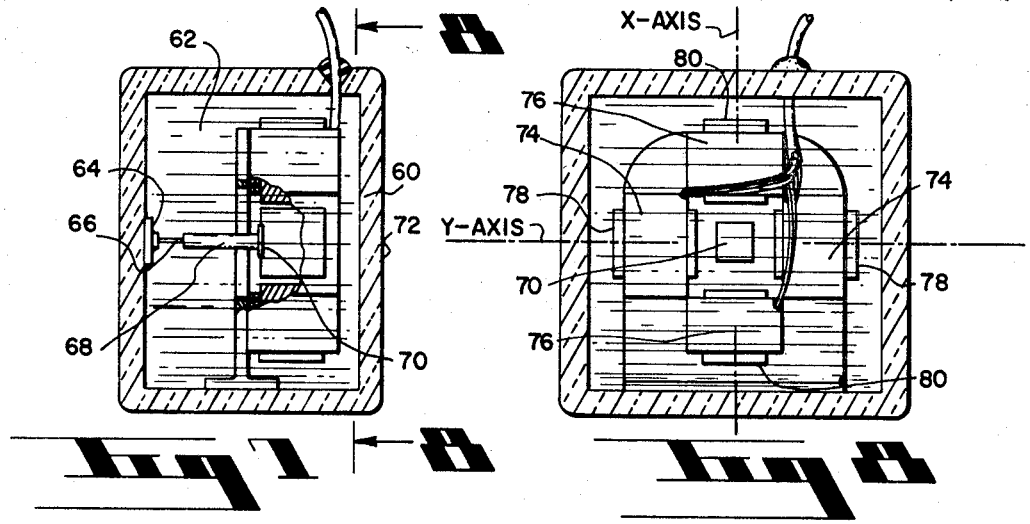
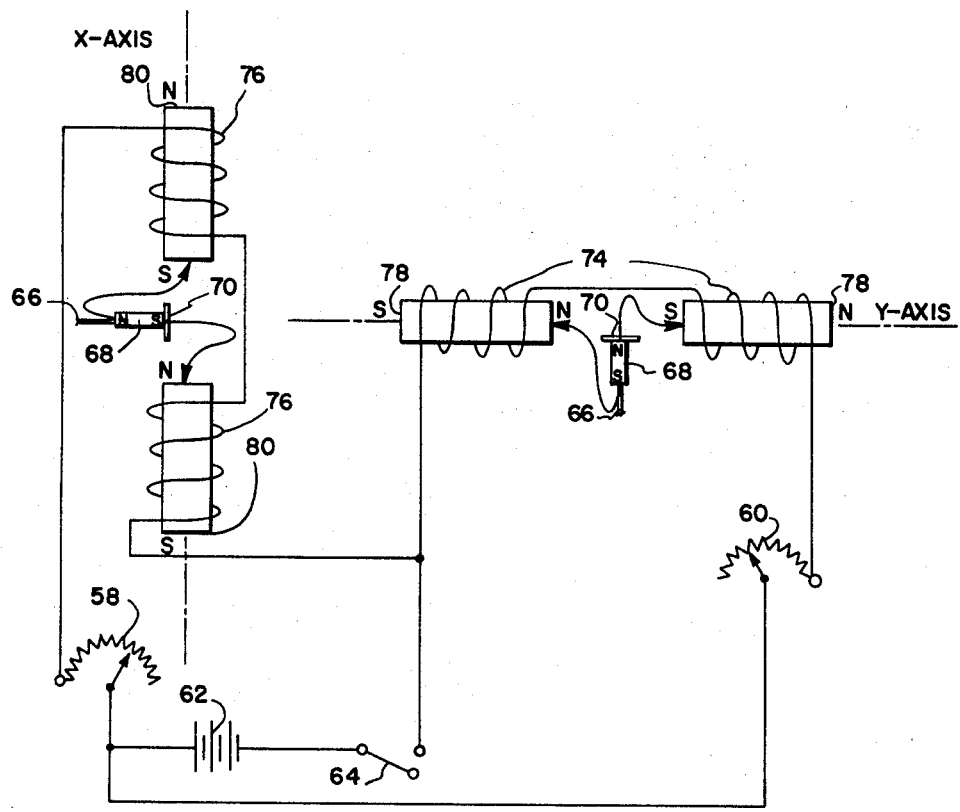

3,410,640
MULTIPLE ORDINATE LOCATING INSTRUMENT
William A. Rhodes, Phoenix, Ariz., assignor to Escoa Corp., Phoenix, Ariz., a corporation of Arizona
Filed Feb. 21, 1966, Ser. No. 529,132
8 Claims. (Cl. 353—27)

This invention relates to a multiple ordinate locating instrument, and more particularly, to a multiple ordinate locating instrument which may be used to sense electrical signals from two sources of information at one time and which may combine graphically an indication of the magnitude of the two sources of information at one graphic location.

The prior art contains multiple ordinate locating instruments which are very complicated and expensive, some of which involve expensive chart drives employing linear marking pens which are driven by several amplifiers to drive an integrated reading of multiple ordinates with respect to a graphic media, such as graph sheet or the like.

Other prior art practices involve the employment of separate meter readings and manual plotting independently of multiple ordinates on graphic media. In many instances, the latter practice is impractical due to the time element necessary for such plotting practice with respect to the occurrence of the information media with respect to time.

Accordingly, it is an object of the present invention to provide a multiple ordinate locating instrument which permits the sensing of a plurality of signals which may be varied in magnitude with respect to two axes disposed substantially at 90° to each other and whereby the instrument of the invention may combine the signals in accordance with their magnitude in a manner graphically to indicate both signal magnitudes at one location.

Another object of the invention is to provide a universally movable magnetically responsive means carrying a reflector and electro-magnetic means for moving the magnetic responsive means and reflector to vary the location of a light beam from a light source to a graphic means whereupon the magnitude of two signals may be plotted at a common point or location.

Another object of the invention is to provide a novel universally movable means comprising a permanent magnet controlled reflector and whereby the permanent magnet is disposed in a media position between two sets of Helmholtz coils which are oriented substantially 90° apart in order to independently and uniformly influence movement of the magnet and the reflector in two different axes substantially 90° apart, such that light from a light source is reflected from said reflector onto a graphic media with respect to two axes thereon, said last mentioned axes being disposed substantially 90° apart.

Another object of the invention is to provide a multiple ordinate locating instrument which may be as sensitive as a galvanometer or microammeter and may thus be energized directly by the source of electrical energy from which the readings are transduced and whereby the instrument of the invention may thus operate without the neccessity of using any amplification means.

Another object of the invention is to provide a multiple ordinate locating instrument which may graphically plot information on separate axes disposed substantially 90° apart without the necessity for a linear chart drive or servo amplifier.

Another object of the invention is to provide a novel multiple ordinate locating instrument comprising a container in which damping fluid buoyantly supports a universally movable member carrying a permanent magnet and a mirror operating in the influence of a pair of Helmholtz coil sets which are axially oriented substantially 90° apart, such that the fluid in the container damps the response of the permanent magnet to energizations of the Helmholtz coils, such that the mirror or reflector which receives light through a transparent wall of the container may reflect light to a graph or an ordinate reference means very accurately and quickly without undue oscillatory movement of the reflector and the light transmitted therefrom to the graph media on the said ordinate reference means.

Further objects and advantages of the invention may be apparent from the following specification, appended claims and accompanying drawings, in which:

FIG. 1 is a top or plan view of a multiple ordinate locating instrument in accordance with the invention and showing parts and portions of the structures of the instrument broken away and in section to amplify the illustration;

FIG. 2 is an enlarged side elevational view of a portion of the instrument in accordance with the invention, said side elevational view taken from the line 2—2 of FIG. 1;

FIG. 3 is an enlarged sectional view taken from the line 3—3 of FIG. 1;

FIG. 4 is an enlarged sectional view taken from the line 4—4 of FIG. 1, showing a reticule means of the light source of the instrument of the invention;

FIG. 5 is a diagrammatic view of the electromagnetic means of the invention coupled to a power source and signal input means;

FIG. 6 is a view taken from the line 6—6 of FIG. 1, showing an ordinate reference means of the invention having graph media thereon and illustrating a light pattern cast thereon in accordance with ordinates sensed fication of the invention;

FIG. 7 is a view similar to FIG. 3, showing a modifiaction of the invention;

FIG. 8 is a sectional view taken from the line 8—8 of FIG. 7; and

FIG. 9 is a view similar to FIG. 5, but showing diagrammatically an electromagnetic means of the invention in accordance with the modification disclosed in FIGS. 7 and 8 of the drawings.

The instrument of the invention includes a light source 10 which may be in the form of a conventional light projector having an objective lens 12, a lamp 14 and reticule plate 16 which plate is also shown in FIG. 4 of the drawings, the plate 16 having an opening 18 therein provided with a cross reticule 20 adapted to cast a corresponding shadow.

It will be understood, however, that the light source 10 may be a conventional source of directional light, if desired, whereby a parallel beam may be projected in a direction of an arrow A toward a reflector 20 which is preferably a mirror mounted on a universally movable means 22. The specific universally movable means 22 is a spherical member, as shown in FIG. 3 of the drawings, buoyantly supported in viscous or damping fluid 24 within the confines of a container 26, the container having a transparent wall 28 through which the light, as indicated by the arrow A, may pass to a frontal or reflective mirror surface 30 of the reflector 20.

Carried by the universally movable means is a permanent magnet 32 normally maintained in an alignment position by a primary force means 34 which may be a permanent magnet or modified structure, as will be hereinafter described in detail. As shown in FIG. 1, however, the primary force means is a permanent magnet 34 adapted to maintain the permanent magnet 32 in substantial alignment with the beam A from the light source 10.

The container 26 is provided with a base 36 and wound around this container 26 are a pair of Helmholtz coils.

One Helmholtz coil comprises two series coil sections 40 which are disposed substantially on a horizontal axis and which are spaced apart a distance equal to the mean radius of either coil. Another Helmholtz coil is provided with a pair of series coil sections 42 and these are disposed on a substantially vertical axis and spaced apart a distance equal to the mean radius of one of the coils.

It will be seen that the axis of the horizontally disposed Helmholtz coil 40 is designated the Y axis of FIG. 1 and that the Helmholtz coil 42 is disposed on a vertical axis designated as the X axis in FIG. 3 of the drawings.

The field strength of both these coils 40 and 42 midway between their respective coil sections is uniform over a considerable area which surround the permanent magnet 32 and provide for uniform influence in both the X and Y axis so that the permanent magnet 32, as well as the universally movable member and the reflector 20, may be moved independently in two directions substantially 90° apart by means of the Helmholtz coils 40 and 42.

It will be appreciated that these coils are disposed, such that their axes are substantially 90° apart.

The reflector 20 at its surface 30 is directed to project light, as indicated by an arrow B, toward an ordinate reference means 46 which may include a glass plate 48 and a translucent graph member 50, as shown in FIG. 6 of the drawings, which is provided with horizontal lines 52 and vertical lines 54, such that when the reflection of the reticule 20 is projected to the ordinate reference means, it forms a light pattern 56, as shown in FIG. 6 of the drawings, containing the shadow of the reticule 20, as shown in FIG. 4, to indicate an exact ordinate position.

Since the influence of the separate Helmholtz coils are completely independent with reference to the permanent magnet 32, two sources of information may be plotted concurrently upon disposition of the reticule shadow 56. As for example, direction and velocity may both be indicated concurrently and with a single ordinate position of the shadow 56.

With reference to FIG. 5 of the drawings, it will be seen that variable energy input means 58 and 60 are coupled with leads of the respective Helmholtz coils 42 and 40, respectively. These coils, as shown in FIG. 5, and the variable energy input means 58 and 60 may be coupled to a battery 62 and utilizing a switch 64 in circuit therewith to energize the coils to indicate the relative values of signals provided by the variable energy input means 58 and 60. These devices 58 and 60 may be transducers, rheostats or any other suitable means for varying the amount of electrical energy to the coils 42 and 40, such that the electrical energy to these coils will be in proportion to the magnitude of the signal which operates these variable energy input means 58 and 60. Thus, it will be appreciated that velocity and direction or any two signals of varying magnitude may be plotted by a single shadow 56 of the reticule 20, as shown in FIG. 4 of the drawings, or the center of directional light imposed in a position comparable to the shadow 56, as hereinbefore described.

It will be appreciated that the instrument of the invention permits the reading of two sources of information at once and the combining of these readings at one point so that they may be graphically recorded or photographically recorded, as desired. The sources of information shown, as for example, in FIG. 6, may both be recorded on a graph sheet 50 by simply plotting a dot at the center of the reticule shadow 56 which greatly speeds up the recording of data or the ordinate reference means may be photographed each time the switch 64 is closed, if desired. It will be appreciated also that accuracy and sensitivity of the instrument is very great since the floating sphere 22 operates very effectively as a universally movable means in two axes and the fluid 24 in a viscous manner, damps the movement of the universally movable means 22, such that it does not oscillate appreciably and such that the shadow 56 very quickly reaches it ordinate position and remains steady for either photographing or plotting of such positions. It will be further appreciated that this invention fills a gap which exists between ordinary meter movements and the necessity of reading each one of a pair of meters separately and also the very expensive chart drives where a linear pen must be driven by a servo amplifier to derive an integrated reading of time and input signal, as for example. The instrument of this invention is particularly sensitive and equals that of a galvanometer or microammeter and may be connected directly to the source from which the readings are taken without the need for any amplification. Thus, in certain applications, this instrument provides for readings along the X and Y axis simultaneously without need for a linear chart drive or servo amplifier.

If desired, more accurate calibration of the universally movable sphere position, additional or secondary coils with bias current fed therethrough and controls therefor, may be provided. Additionally, a proper design of the magnet 34 may be accomplished for calibrating scale linearity with respect to a flat face of the ordinate reference means 46.

Further, it will be understood that the specific gravity relationship between the sphere 22 and its magnet 32 and the liquid 24 are adjusted so as to permit only slightly lesser gravity of the sphere and therefore, allowing only the smallest fraction of the sphere to protrude above the surface of the liquid 24. Thus, the higher the sphere is allowed to float above the liquid, the greater is the damping effect in the vertical plane because of surface tension against the sphere surface. Horizontal damping is not effected by this tension.

It will be understood that the magnet 34 may be so positioned as to maintain a normal or zero position of the shadow 56 on a lower lefthand corner of the element 50, as indicated by broken lines C in FIG. 6 of the drawings. Accordingly, it will be understood that in the absence of the alignment magnet or alignment coils with adjustable bias, the alignment of the reflector 30 might not return to the zero position. Further, it will be appreciated that simultaneous deflection of the magnet 32 in both the X and Y axes may be effected without distorting or adversely affecting either of the relationships vertically or horizontally which may be indicated by the shadow 56 or light on the ordinate reference means.

In the modification, as shown in FIG. 9 of the drawings, a container 60 contains a damping fluid 62 and internally of the container, a mount 64 supports a universally movable member 66 which, in this case, is a universally deflectible spring which supports a magnet 68 similar to the magnet 32. An end of the magnet 68 carries a mirror 70 directed toward a transparent light transmitting wall 72 of the container 60, said wall 72 being similar to the wall 28, hereinbefore described. The mirror 70 facing the light source 10, as hereinbefore described.

Surrounding the magnet 68 are two pairs of coils, one pair of coils being designated 74 affecting the magnet 68 on a horizontal axis and another pair of coils designated 76 being capable of affecting the magnet on a vertical axis. The horizontal axis being the Y and the vertical axis being the X axis.

These coils 74 and 76 are provided with respective magnetic armatures 78 and 80, respectively, which react upon the magnet 68 in a manner similar to that hereinbefore described.

The variable energy input means 58 and 60, hereinbefore described, may be used in connection with the modified structure, shown in FIGS. 7 and 8 of the drawings, and the mode of operating the modification, shown in FIGS. 7 and 8, may be similar with respect to the light source 10 and the ordinate reference means 46, hereinbefore described.

It will be noted that the magnet 68 carrying the mirror 70 being attached to the resilient wire support 66 functions in accordance with the bending of the wire 66 and this bending wire serves as a primary force means in a similar fashion to that of the alignment magnet 34, hereinbefore described. The fluid 62 serves as a damping media for movement of the magnet 68 and this may be a highly viscous fluid, if desired, in order to avoid undue oscillation of the magnet 68, as the coils 74 and 76 are energized. It will be further understood, that the magnet 68 is substantially restrained from rotating on its center in a similar manner to that of the magnet 32 and, thus, one end of the magnet 68 is preferably placed near the center of the magnetic fields of the coils 74 and 76, such that these coils substantially depart from the Helmholtz configuration, since they are wound around ferro-magnetic pole pieces. These pole pieces are located quite close to the magnet 68 and it will be appreciated that the size and shape of the pole pieces may be carefully designed and placed for optimum results.

One advantage of the modified instrument, shown in FIGS. 7 and 8, is that it will operate even though subject to some accelerative forces, whereas the instrument of the invention disclosed in FIGS. 1, 2 and 3 of the drawings, must be operated under static conditions.

Both species of the invention are usable in connection with D.C. sources coupled to the variable energy input means 58 and 60. However, the magnet 68 mounted on the wire 66 will respond to considerable frequency of alternating current whereas the instrument shown in FIGS. 2 and 3 of the drawings will not. Conversely, the specie of the invention, shown in FIGS. 1, 2 and 3, is the most sensitive of the invention and reacts more nearly like a true galvanometer. It has a wider range of deflection per unit input through the variable energy input means 58 and 60 and it may rotate while the magnet 68, as hereinbefore described, may not, but must work against tension of the resilient wire support 66.

It will be recognized by those skilled in the art that both of these species of the invention are substantially the electromechanical equivalents of a cathode ray tube, but fed directly with energy from a source to be read while a cathode ray tube and a servo driven linear percent driven mechanism must employ an amplifier to increase energy for driving them.

It will be obvious to those skilled in the art that various modifications of the present invention may be resorted to in a manner limited only by a just interpretation of the following claims.

I claim:

1. In a multiple ordinate locating instrument the combination of: a light source; a reflector in position for receiving and projecting light from said source; universally movable means carrying said reflector; a support for said universally movable means; a permanent magnet carried by said universally movable means; electromagnetic coils having axes disposed approximately 90° from each other and located to influence movement of said permanent magnet and said universally movable means into planes approximately 90° apart and in accordance with the relative magnitude of electrical energy imposed upon said coils; primary force means tending to hold said permanent magnet in an axial reference alignment position and to hold said reflector in said first mentioned position; and an ordinate reference means adapted to receive light projected from said reflector for locating ordinates on said reference means with respect to two axes disposed approximately 90° apart.

2. The invention, as defined in claim 1, wherein: said support for said universally movable means comprises a container having liquid therein and said universally movable means is blandly supported in said liquid and wherein one wall of said container is transparent and adapted to receive light from said source for transmission to said reflector means and from said reflector means to said ordinate reference means.

3. The invention, as defined in claim 1, wherein: said universally movable means comprises a resilient support for said permanent magnet and wherein said reflector is carried by said permanent magnet.

4. The invention, as defined in claim 1, wherein: said coils each comprise two equal coil portions set coaxially with their mean planes separated by a distance equal to the mean radius of one coil, whereby the field strength midway between the coil portions on each of said axes is uniform over a considerable area.

5. The invention, as defined in claim 1, wherein: said universally movable means comprises a resilient support for said permanent magnet and said permanent magnet and said reflector carried by said permanent magnet and said resilient means includes said primary force means.

6. The invention, as defined in claim 1, wherein: said primary force means comprises a separate second permanent magnet spaced from said universally movable means and said first mentioned permanent magnet to maintain said permanent magnet in said axial reference alignment position.

7. The invention, as defined in claim 1, wherein: said ordinate reference means comprises a plate structure having graphic designations thereon with respect to said two axes which are disposed approximately 90° apart, whereby ordinates may be plotted thereon or photographed with respect to light projected from said reflector on said ordinate reference means.

8. The invention, as defined in claim 1, wherein: said electromagnetic coils comprise a pair of coil sets, each set comprising two equal coils disposed coaxially with their mean planes separated a distance equal to the mean radius of one coil of each set and wherein said permanent magnet is disposed to operate substantially midway between the coils of both sets, one set disposed on one of said two planes and the other of said two sets disposed approximately 90° therefrom; each of the two equal coils of each set in series; and variable energy input means coupled to at least one set of one of said pair of coils.

References Cited

UNITED STATES PATENTS

| | | | |
|---|---|---|---|
| 2,592,329 | 4/1952 | Picard et al. | 88—24 |
| 2,930,668 | 3/1960 | Behrmann et al. | 88—24 |
| 3,224,349 | 12/1965 | Schumann et al. | 95—4.5 |
| 3,315,563 | 4/1967 | Harper et al. | 88—24 |

NORTON ANSHER, *Primary Examiner.*

RICHARD M. SHEER, *Assistant Examiner.*